United States Patent [19]
Mott

[11] 3,993,136
[45] Nov. 23, 1976

[54] APPARATUS FOR OPERATING A CLOSURE ELEMENT OF A SUBSURFACE SAFETY VALVE AND METHOD OF USING SAME

[75] Inventor: James D. Mott, Houston, Tex.

[73] Assignee: Hydril Company

[22] Filed: Aug. 25, 1975

[21] Appl. No.: 607,696

[52] U.S. Cl. .............................. 166/314; 166/315; 166/324; 137/461
[51] Int. Cl.² ........................................ E21B 43/12
[58] Field of Search .............. 166/224 A, 224 R, .5, 166/314, 315; 137/629, 460, 461; 251/58, 62; 175/242, 65, 72

[56] References Cited
UNITED STATES PATENTS

| | | | |
|---|---|---|---|
| 3,347,318 | 10/1967 | Barrington | 166/226 |
| 3,583,442 | 6/1971 | Dollison | 166/224 A X |
| 3,667,505 | 6/1972 | Radig | 166/224 A X |
| 3,667,557 | 6/1972 | Todd et al. | 175/242 |
| 3,703,193 | 11/1972 | Raulins | 166/224 A X |
| 3,744,564 | 7/1973 | Mott | 166/224 A |
| 3,763,940 | 10/1973 | Mott | 175/65 |
| 3,780,809 | 12/1973 | Ayers, Jr. | 166/224 A X |
| 3,827,494 | 8/1974 | Crowe | 166/224 A |
| 3,830,297 | 8/1974 | Cockrell | 166/224 A |
| 3,868,995 | 3/1975 | Crowe | 137/629 X |
| 3,901,315 | 8/1975 | Parker et al. | 166/224 A |
| 3,901,321 | 8/1975 | Mott | 166/224 A X |

Primary Examiner—Stephen J. Novosad
Attorney, Agent, or Firm—Pravel & Wilson

[57] ABSTRACT

Disclosed is a method of utilizing an apparatus for effecting operation of valve closure element in a subsurface safety valve. Preferably, a ball-type closure element is at least partially spaced from sealing engagement with a valve seat for equalizing well pressure about the ball closure element and minimizing frictional resistance of the ball element to operating rotation prior to effecting rotation of the ball element about a pair of substantial fixed ball element support members concentrically engaging the ball element on opposite sides thereof. Rotating cams move a lower seat from the ball element in response to initial reciprocating movement of the valve operator prior to effecting partial spacing and rotating open the ball element.

37 Claims, 16 Drawing Figures

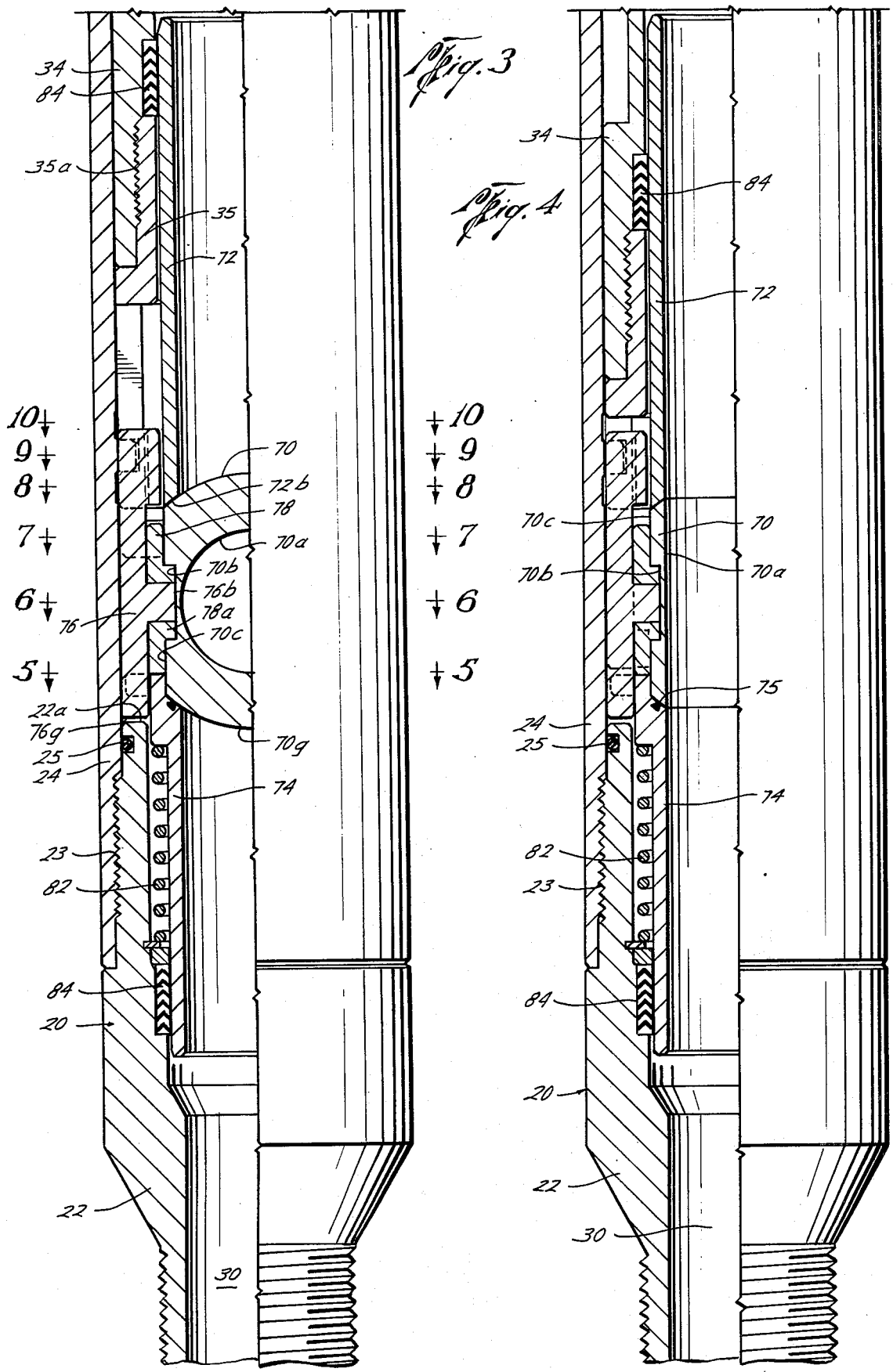

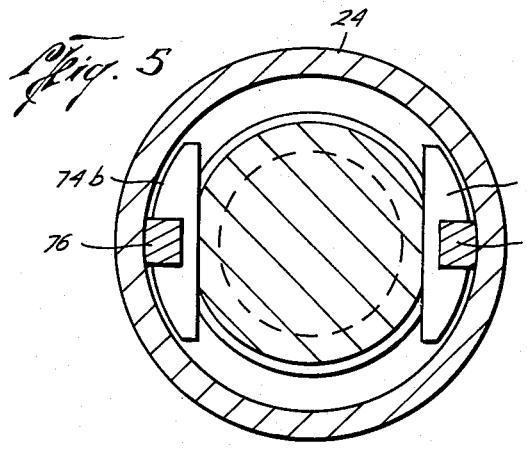
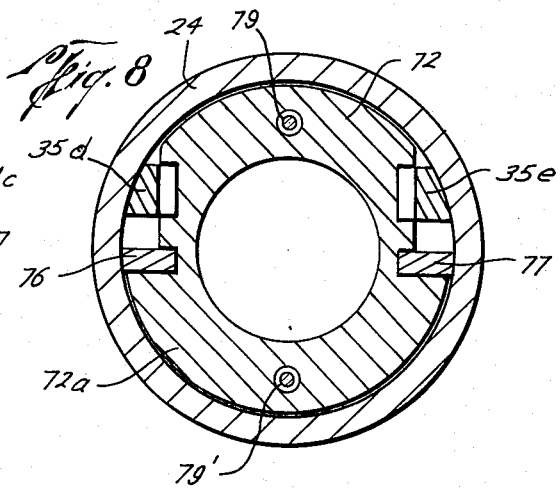
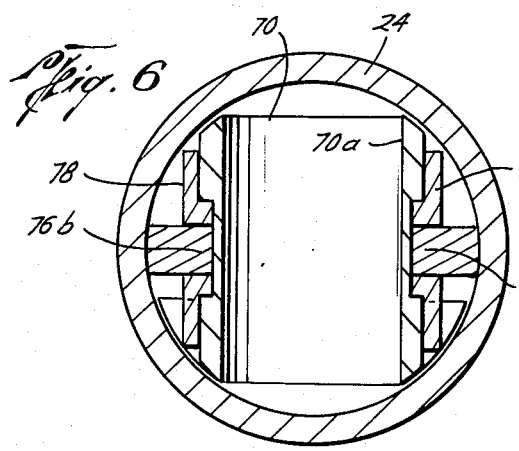
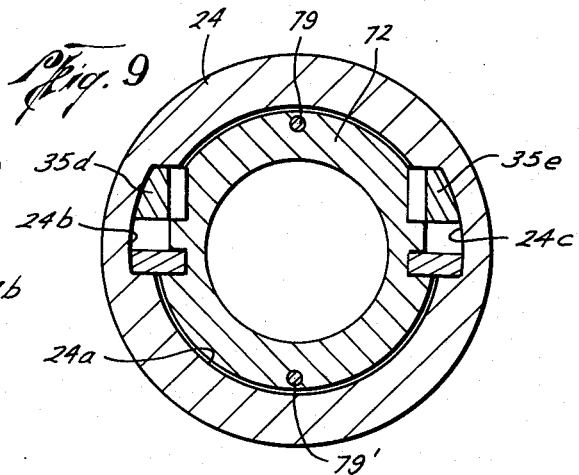
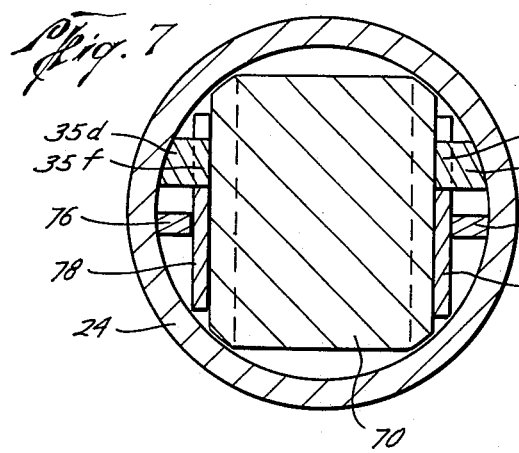
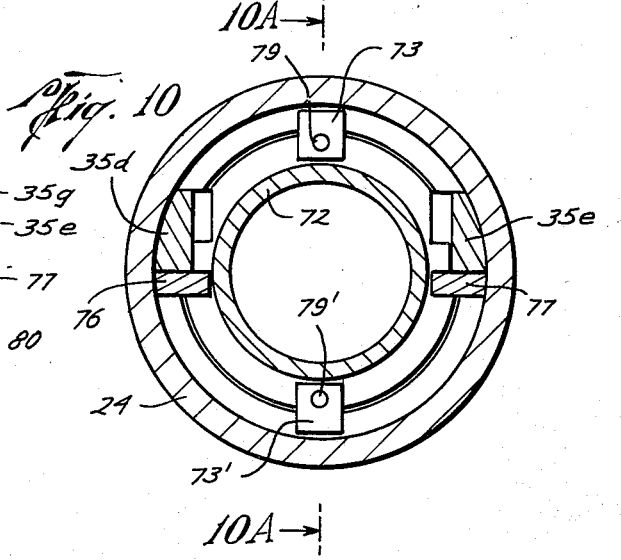

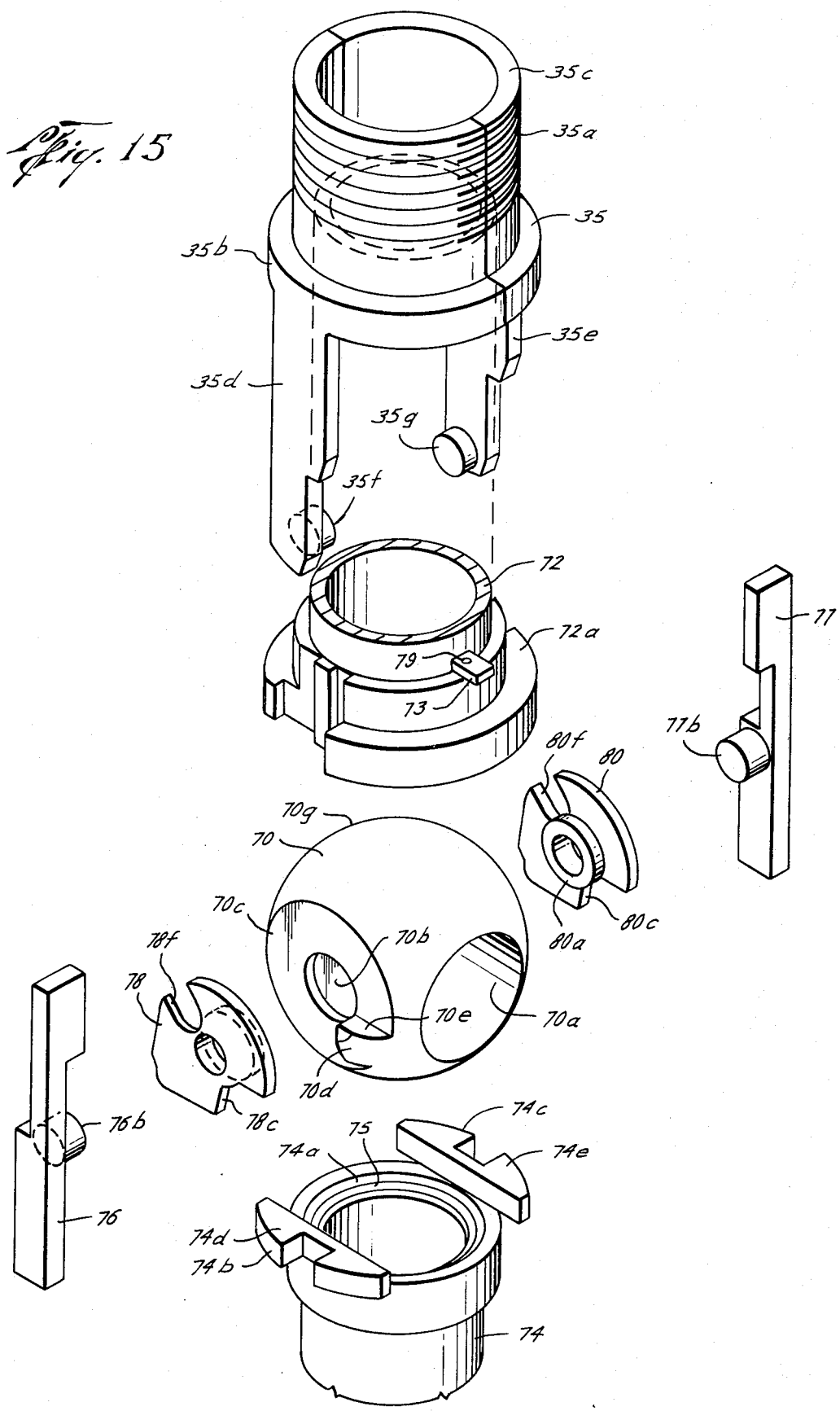

APPARATUS FOR OPERATING A CLOSURE ELEMENT OF A SUBSURFACE SAFETY VALVE AND METHOD OF USING SAME

BACKGROUND OF THE INVENTION

This invention relates broadly to the field of a safety valve method and apparatus and particularly to a ball-type subsurface safety valve for wells.

In my U.S. Pat. No. 3,901,321 there is an extensive consideration of the problems to be solved and the state of the prior art with respect to subsurface safety valves and in particular ball-type subsurface safety valves and reference is hereby made to that patent for incorporation herein for all purpose and in particular for the prior art and the consideration of the prior art set forth therein. From this prior art consideration two primary operating problems effecting reliability of subsurface safety valves primarily emerge--the inherent mechanical or frictional resistance to operating movement and differential well pressure loading of the closure element during opening. The valve disclosed therein overcomes these problems by spacing both seats from the ball for equalizing the differential well pressure across the ball prior to opening the ball by moving the ball longitudinally downward with a pair of support pins concentrically engaging the ball on opposite sides thereof. The disclosed valve was of complex construction in that it employed upper and lower operator members, each of which was spring biased and fluid pressure responsive. Prior to and since the filing of my application on Dec. 26, 1973 maturing into U.S. Pat. No. 3,901,321, a number of additional patents have issued furthering the present state of the art with respect to the present invention and which should be considered.

U.S. Pat. No. 3,771,603 to Crowe discloses the use of rotational movement limiting stops formed between the ball cage and the ball closure element. The eccentric pins engaging the ball for effecting rotation are fixed in the ball and the ball element is moved longitudinally relative to the pivot pins for effecting rotational movement by upper and lower sleeves sealingly engaging the ball for reciprocating the ball in opposite directions to effect the desired operation. Well fluid pressure equalization about the ball element is achieved prior to effecting operning rotation by a lost motion arrangement with the operator sleeve to minimize differential well pressure loading in a manner similar to that disclosed in my U.S. Pat. No. 3,7662,471. As the primary closing spring is located to urge on the lower operator sleeve and the fluid pressure responsive surfaces for effecting opening is located on the upper operator sleeve, the "gross force" required for overcoming the urging of the closing spring and rotating the ball must be transmitted through the sealing engagement with the ball. As the frictional force opposing rotation is a function of the magnitude of the force between the operator seats and the ball the transmitting of the "gross force" through the ball inherently increases the frictional resistance to rotation. U.S. Pat. No. 3,796,257 to Hudson operates in a similar manner. U.S. Pat. No. 3,827,494 to Crowe and entitled "Anti-Friction Ball Valve Operating Means" discloses an arrangement for effecting support of the ball during rotation similar to that disclosed in my copending application Ser. No. 212,260, filed Dec. 27, 1971. A resilient secondary upper seat is disclosed in this Crowe patent as being disposed outwardly and adjacent the upper operator sleeve (such as disclosed in U.S. Pat. No. Re. 28,131 of U.S. Pat. No. 3,741,249) with the upper operator sleeve engaging the ball for longitudinally moving the ball downwardly relative to the fixed eccentric pins to effect rotation of the ball to the open position. The spring biased lower operating sleeve sealingly engages the ball element and carries movably mounted thereon and in concentric outwardly relationship a sleeve having a pair of upwardly projecting support fingers that concentrically engage the ball on opposite sides thereof for carrying part of the "gross force" to effect operation and thereby partially reducing the rotation resisting frictional forces of the upper and lower operator sleeves acting on the sealing surface of the ball.

In U.S. Pat. No. 3,868,995, also to Crowe, there is disclosed a subsurface safety valve minimizing well pressure loading on the ball by providing a vent valve through the ball element in a manner somewhat similar to that disclosed in my U.S. Pats. Nos. 3,667,557 and 3,763,940. In this Crowe patent, concentric pins mounted on the operator sleeve engage the ball base for moving the ball base longitudinally from the ball cap to expose a vent by-pass in the ball cap for equalizing well fluid pressure across the ball cap. The ball cap is not moved from sealing engagement with the upper operator sleeve during opening rotation although the ball is spaced from the secondary resilient seat prior to rotation. Eccentric pins secured with the housing effect rotation of the ball as the ball moves toward the stationary lower seat when in the open position. The member mounting the concentric pins in engagement with the ball transmits the gross force to the spring independent of the sealing force of the primary operator sleeve which follows the ball downwardly by the force of control fluid pressure. Thus only a "net force" is imparted to the ball for effecting rotation and such net operating force is imparted to the ball through pins engaging the ball on opposite sides thereof.

Taylor U.S. Pat. No. 3,826,462 primarily emphasizes the disclosed large diameter ball feature in a wireline retrievable valve and which is also disclosed in my earlier filed U.S. Pat. Nos. 3,762,471 and 3,870,102. In the Taylor disclosure, the concentric fingers engaging the ball move longitudinally, but do not effect longitudinal movement of the ball as they serve only as a movement guide. The eccentric pins engaging the ball are fixed with the cage and there is no spacing from the upper and lower seats which are used for effecting the longitudinal movement of the ball resulting in the desired rotational move. The closing spring is also located below the ball element and therefore the gross force is transmitted through the ball for effecting operation.

U.S. Pat. No. 3,847,218 to Boyadjieff et al. discloses a rotatable ball valve in which the ball is rotated closed when in the lower position and is therefore reversed from the usual operation where the ball is rotated open when in the lower position. In this patent the ball element is pulled longitudinally upwardly by a cage member having concentric pins engaging the ball with the eccentric pins fixed with the housing for rotating the longitudinally moving ball. The disclosed ball element engages a stationary resilient sealing seat when in the lower position and moves away from the resilient seat when being pulled upwardly to the open position. From the disclosure it is not clear whether there is spacing prior to rotation as in U.S. Pat. No. Re. 28,131 or if the ball merely rotates off the seat as in Barrington U.S. Pat. No. 3,347,318.

U.S. Pat. No. 3,398,762 discloses a ball-type subsurface safety valve in which the ball is rotated about a pair of longitudinal axis in moving to and from the open and closed positions to minimize frictional resistance to the rotation. There is no disclosure of spacing the ball from the seats to minimize frictional resistance to rotation.

Radig U.S. Pat. No. 3,667,505, like Bostock U.S. Pat. No. 3,894,715, discloses a ball-type safety valve in which a longitudinal reciprocating operator member is connected with the ball element for effecting rotation of the ball element. The ball element is restricted against longitudinal movement with the operator by constant engagement with upper and lower annular seats that provide frictional resistance to rotation by the ball element even though only a net force is transmitted to the ball element.

SUMMARY OF THE INVENTION

This invention relates to a new and improved apparatus for operating a closure element of a subsurface safety valve and method of using same.

A normally closed subsurface safety valve having a shiftable flow closure element is disposed between and engageable with a pair of seats, both of which preferably sealingly engage the flow closure element. A reciprocating operator is connected with the flow closure element to effect shifting of the flow closure element with minimum frictional resistance to control flow when differential well fluid pressure across the closure element is reciprocating movement of the operator member operates a camming mechanism to move one seat from engagement with the ball and effect shifting of a closure element support to move the axis of shifting movement of the closure element sufficiently to partially space the closure element from the second seat to enable well pressure equalization about the flow closure element prior to shifting. Preferably, a ball-type closure element mounted with the valve housing and having only limited longitudinal movement relative thereto to effect the partial spacing is employed. The ball element is supported on concentric pins which also support a pair of rotating cams for spacing the lower seat from the ball element. The reciprocating operator member carries a fluid pressure responsive surface for opening the valve and engage urging means for closing the valve above the eccentric pin engagement with the ball element and cams to assure only a net force is imparted to the ball element and cams at the engagement by the eccentric pins.

An object of the present invention is to provide a new and improved apparatus for operating a closure element of a subsurface safety valve and method of using same.

A further object of the present invention is to provide a new and improved method for operating a subsurface safety valve in a more reliable manner to overcome the prior art problems set forth hereinabove.

Another object of the present invention is to provide a new and improved subsurface safety valve apparatus of simplified and more reliable construction to overcome the prior art problems set forth hereinabove.

BRIEF DESCRIPTION OF THE DRAWINGS

FIG. 3 is a side view, in section, of the lower portion of the safety valve well tool apparatus of the present invention illustrating the ball-type flow closure element in the closed position;

FIG. 4 is a view similar to FIG. 3 with the ball-type flow closure element in the open position;

FIGS. 5, 6, 7, 8, 9 and 10 are views taken along lines 5—5, 6—6, 7—7, 8—8, 9—9 and 10—10, respectively of FIG. 3;

FIG. 15 is an exploded perspective view illustrating the relationship of the mechanism illustrated in FIG. 3.

DESCRIPTION OF THE PREFERRED EMBODIMENT

Figure 1:
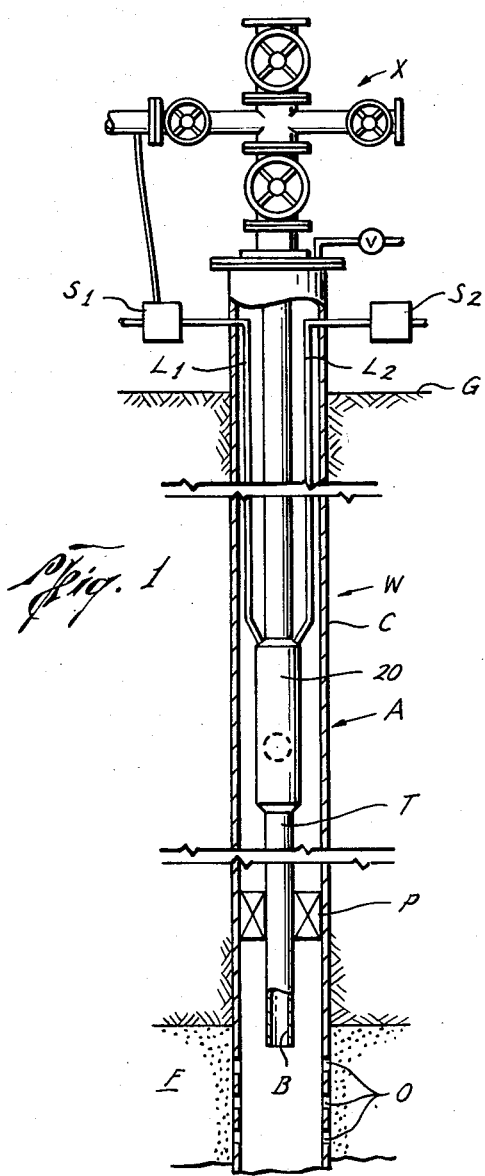
FIG. 1 is a side view, partially in section, of a well having a surface controlled safety valve well tool apparatus of the present invention operably disposed at a subsurface location in the well.

As illustrated in FIG. 1, a well safety valve apparatus A of the present invention is preferably mounted in a well conduit or production tubing T at a subsurface location in a well W for controlling flow of well fluids through the bore B of the production tubing T to the well head or christmas tree X at the earth surface G in the usual manner. A packer P is located in the well W below the safety valve apparatus A for sealing between the production tubing T and the well casing C for directing the flow of well fluids from the formation F through the perforations O into the casing C to flow into the bore B of the production tubing T. The christmas tree X may be located on the earth surface G below a body of water such as disclosed in copending application Ser. No. 580,240 filed May 23, 1975 and to which reference is made for incorporation of that disclosure herein for all purposes.

While the safety valve apparatus A of the present invention is disclosed in the environment of a surface controlled subsurface safety valve application in a well, it should be understood that a direct controlled-type safety valve apparatus A of the present invention may be utilized in a well W to control flow of fluids from the well W.

Figure 2:
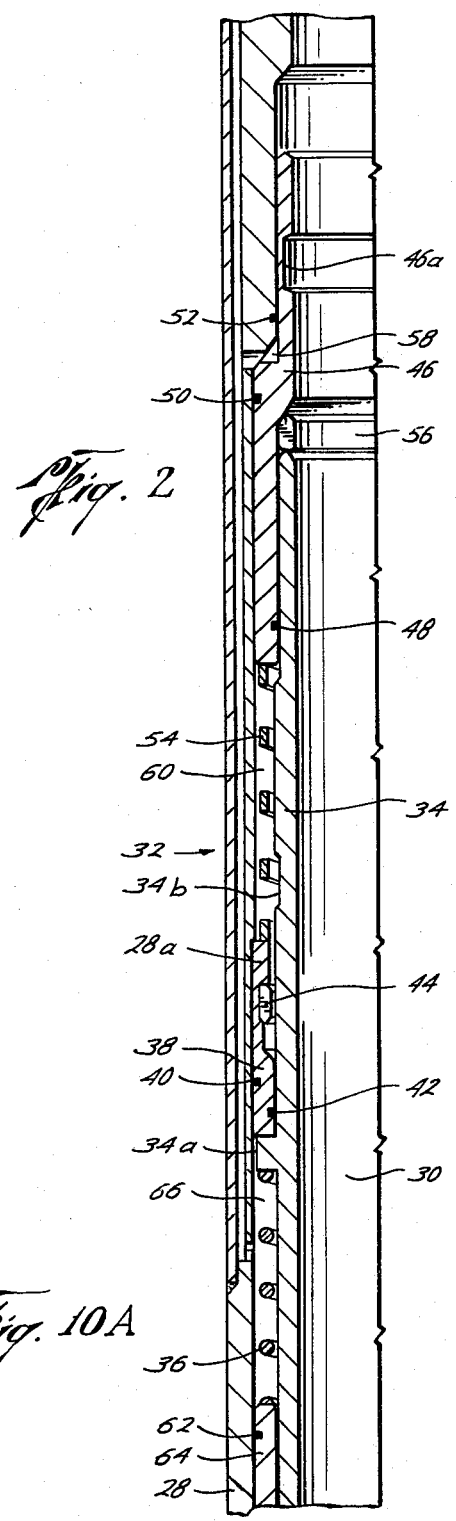
FIG. 2 is a side view, in section of half of the upper portion of the safety valve well tool illustrating the reciprocating operator sleeve member of the present invention.

Referring now to FIGS. 2 and 3, the valve apparatus A includes a tubular flow control valve housing 20 which is adapted to be mounted with the production tubing T at the desired subsurface location in a well W. Suitable connections (not illustrated) may be provided at the upper end of the upper portion of the housing 20 (FIG. 2) and the lower end of the lower portion of the housing (FIG. 3) for mounting or connecting the housing 20 with the production tubing T as is well known in the art. Preferably, box and pin threaded connections are utilized for connecting the valve housing 20 in the production tubing T and forming a portion thereof as a tubing retrievable-type valve as is well known in the art.

The housing 20, for ease of assembly of the apparatus A, is preferably formed by a plurality of tubular members secured together by suitable means, preferably threading, to form an integral tubular unit. In FIG. 3, a lower housing connector sleeve 22 threadedly engages at 23 an intermediate housing sleeve 24. The lower housing connector sleeve 22 preferably has formed thereon at its lower end the threaded pin connection for connecting with the production tubing T while an O-ring seal 25 is carried by the lower sleeve 21 for blocking leakage of well fluids along the threaded engagement at 23 as is well known in the art. Suitable threaded anti-rotation pins (not illustrated) may be employed to prevent inadvertent disengagement of the tubular housing sections or portions such as at threads 23. The main housing sleeve portion 24 extends upwardly for connection with additional tubular sections to form the housing 20 in a desired manner.

In FIG. 2, the valve housing 20 is preferably formed of an operator housing sleeve 28 which extends upwardly from a threaded connection (not illustrated) with the housing sleeve 24 with the upper housing sleeve 28 providing directly or indirectly the means for connecting with the production tubing T above the valve apparatus A and the valve connection inlets for the remote control fluid conduits in the manner substantially as described in my U.S. Pat. No. 3,981,321. As disclosed or suggested previously, one skilled in the art may form the tubular housing 20 of various arrangements to tubular sleeves for ease of assembly of the apparatus A without departing from the scope of the present invention.

The valve housing 20 includes a central straight through passageway 30 formed therethrough for enabling flow of well fluids through the valve housing 20 from the production tubing T by communicating the bore B of the production tubing T below the valve housing 20 with the bore B of the production tubing T above the valve housing 20 in the usual straight through and full opening manner.

As best illustrated in FIG. 2, a movable valve operator assembly is disposed in the bore 30 of the housing 20. The operator assembly 32 is substantially similar to that disclosed in my U.S. Pat. Nos. 3,744,564 and 3,981,321 and to which specific reference is made for the purpose of incorporation of their disclosure herein for all purposes. The valve operator apparatus 32 disclosed is preferable due to the capability to releasably lock the valve apparatus A in the open position when desired for performing well operation. In addition, the operator assembly 32 gives the valve apparatus A the capability to temporarily constrict the bore 30 for landing a through-the-bore retrievable valve in the housing and for effecting operation of the retrievable valve with the controls of the tubing retrievable valve 20 of the present invention if desired. Furthermore, the valve operator assembly 32 provides for hydrostatic balanced valve operation in that the valve operator assembly 32 is essentially insensitive to well pressure conditions urging on the operator apparatus 32 and thereby enabling the hydrostatic heads of the remote control fluids from the surface G to be virtually offsetting to minimize the control fluid pressure necessary to effect operation of the valve apparatus A.

Referring now to FIG. 2, the longitudinally reciprocating primary tubular operator sleeve 34 is concentrically disposed in the flow passage 30 of the housing sleeve 28. Mounted with the housing 28 is a closing biasing spring 36 for urging the longitudinally movable operator sleeve 34 to remain in the upper position. Concentrically disposed between the operator sleeve 34 and the housing 28 is a lower piston ring 38 carrying o-rings 40 and 42 for effecting annular slidable seals with the housing 28 and the tubular operator 34, respectively. Located immediately above the lower piston ring 38 is a radially expansible gap detent locking ring 44. The upper or secondary operating piston is formed by a sleeve 46 which carries an O-ring 48 to form a sliding fluid seal with the primary operator sleeve 34. The secondary operating piston sleeve 46 carries an O-ring 50 for effecting a sliding fluid annular seal with the housing 28 while the housing 28 carries an O-ring 52 for effecting a fluid annular sliding seal with the secondary operating sleeve 46 above the operator sleeve 34. A second closing urging spring 54 is disposed below the secondary operating piston sleeve 46 for urging upwardly thereon. Positioned between the secondary operating piston sleeve 46 and the operator member 34 is the gapped constrictable landing ring 56 which may be radially constricted when desired to form a landing shoulder for the through-the-bore movable valve such as disclosed in copending application Ser. No. 580,240, filed May 23, 1975.

The seal effected by the O-rings 52 and 50 to find an upper expansible chamber 58 for urging the upper or secondary operating piston sleeve 46 to move downwardly in response to increased control fluid pressure in the chamber 58. The downward movement of the secondary operating sleeve 46 engages the landing ring 56 and the operator sleeve 34 for also effecting their downward movement in response to increased control fluid pressure in the upper chamber 58 which overcomes the upwardly urging of the spring 54 and the spring 36. The O-rings 48 and 50 also define the upper portion of an intermediate or normal operating expansible chamber 60 while the O-rings 40 and 42 mounted with the longitudinally movable piston 38 define the lower portion of the intermediate expansible chamber 60. An O-ring 62 is carried by a spring support ring 64 that is secured to the housing 28 to provide the support for the spring 36. The O-ring 62 which along with O-rings 40 and 42 on the longitudinally movable piston 38 defines a lower expansible chamber 66.

The control fluid pressure communicated into the intermediate annular or normal operating chamber 60 urges on the piston ring 38 for urging it to move downwardly and overcome the upwardly urging of the spring 36. Downward movement of the piston ring 38 effects engagement with the outwardly projecting collar 34a of the operator sleeve for effecting downward movement of the operator sleeve 34 with the lower piston 38. The increased control fluid pressure in the intermediate operating chamber 60 urges upwardly on the upper operating sleeve 46 for assisting the spring 54 to maintain the secondary operating piston 46 in the upper position. Thus, it is to be understood that increased control fluid pressure at either the upper expansible chamber 58 or the intermediate expansible chamber 60 will effect downward movement of the operator sleeve 34 for operating the safety valve apparatus A.

Increased fluid pressure in the lower expansible chamber 66 urges the lower piston ring 38 to move upwardly towards the locking detent 44. By communicating increased control fluid pressure into the upper expansible chamber 58 and the lower expansible chamber 66, the secondary operating piston sleeve 46 will effect downward movement of the operator sleeve 34 while the lower piston ring 38 is blocked from upward movement by engagement with the detent 44 which in turn engages inwardly projecting annular collar 28a of the housing sleeve 28. When the upper operating sleeve 46 has effected sufficient downward movement of the operator sleeve 34 to align a recess 34b with the detent 44 the piston ring 38 cooperates with the detent 44 for moving the detent 44 into the recess 34b with the piston ring 38 locking or maintaining the detent 44 in the recess 34b. When control fluid pressure in the upper expansible chamber 58 and the lower expansible chamber 66 is vented or otherwise reduced the spring 36 is blocked from moving the operator sleeve 34 upwardly because of the engagement of the detent 44 with the collar 28a, but the spring 54 is able to move the secondary or upper operating sleeve 46 back to the upper position. In this manner the operator sleeve 34 may be locked in the lower position to lock the valve apparatus A in the open position. To release the operator sleeve 34 from the lower locked position it is only necessary to increase the control fluid pressure in the intermediate expansible chamber 60 which moves the lower piston ring 38 downwardly for releasing the detent 44 from the recess 38a and enabling the spring 36 to move the operator sleeve 34 to the upper position when the control fluid pressure in the intermediate expansible chamber 60 is reduced or vented. With the operator sleeve 34 locked in the open position, the wire-line retrievable or TFL valve operably engages recesses 46a in the sleeve 46 and is operated open by increasing the control fluid pressure in the upper expansible chamber 58 and the lower expansible chamber 66.

While the operator sleeve 34 has been disclosed herein as possessing many capabilities, it will be understood that reciprocating movement of the operator sleeve 34 is the key to the operation of the safety valve apparatus A of the present invention and the reciprocation of the operator sleeve 34 may be achieved by urging thereon in a number of different manners. An example, by way of illustration and not of limitation, is to utilize the well pressure in the flow passage 30 for urging on the operator sleeve 34. Such arrangements are to be understood as known in the art.

The safety valve apparatus A of the present invention includes a movable flow closure element 70, preferably of the ball-type, that cooperates with upper and lower seat means 72 and 74, respectively, for controlling flow of fluid through the passageway 30 of the housing 20. The rotatable ball closure element 70 is provided with a central opening or bore 70a therethrough with the ball rotatable from the closed position (FIG. 3) with the bore 70a disposed transverse to the passageway 30 for blocking flow of fluid through the passageway 30 with the ball 70 and the open position (FIG. 4) with the bore 70a aligned with the passageway 30 for enabling flow of well fluids through the housing 20. The diameter of the bore 70a of the ball 70 is substantially equal to the diameter of the bore of the passageway 30 and the seat means 72 and 74 to eliminate any well fluid flow restriction or restriction to passage of through-the-bore tools during well servicing operations. As is best illustrated in FIGS. 3 and 4, the ball 70 is in the closed position when the operator sleeve 34 is in the upper position with the ball 70 moving to the open position when the operator sleeve 34 moves to the lower position.

During reciprocation of the operator sleeve 34, the ball 70 is mounted against more than a slight longitudinal movement as will be set forth in greater detail hereinafter.

As is best illustrated in FIGS. 3 and 4, the ball 70 is concentrically engaged and supported by a ball rotation support member 76 which is also illustrated in FIG. 15. An identical ball rotation support member 77 is disposed on the opposite side of the ball 70 for providing a second support for the ball and it should be understood that the member 77 is in all respects the same as the member 76 to which reference will be made hereinafter. The member 76 forms a downwardly facing lower shoulder 76a (FIG. 3) which is slightly spaced from an upwardly facing annular shoulder 22a provided by the sleeve 22 of the housing 20. Such space enables a slight longitudinal movement of the ball 70 as will be described in greater detail hereinafter.

The ball support member 76 forms an inwardly projecting pivot pin or trunion 76b on which a cam disc 78 is rotatably mounted. Cam disc 80 is mounted on the pin 77b of the support 77 in a similar manner.

The cam disc 78 forms an inwardly projecting collar 78a receiving therein the finger 76b of the support member 76 and which collar 78a extends inwardly to fit within a concentric recess 70b formed on the flat 70c of the ball 70. The cam disc 80 and support member 77 engage the opposite flat (not illustrated) of the ball 70 in a similar manner. Formed on the flat 70c is an outwardly projecting lug 70d of the ball providing cam engaging surfaces 70e and 70f (FIG. 11) while a similar lug (not illustrated) coacts with cam disc 80. The lug 70d forms ball operating surfaces 70e and 70f adjacent cam operating surfaces 78b and 78c, respectively. Adjacent the cam operating surface 78c is a cam operating surface 78d that is provided with a rounded portion 78e.

The cam disc 78 is slotted at 78f to receive eccentric operator pins for effecting rotation of the cam disc 78 about the collar 78a in a manner to be set forth in greater detail hereinafter. The cam disc 80 is similar to the cam disc 78, but is a reverse copy in order to place the cam slots 80f on the same side of the axis of rotation of the ball 70 as the cam slot 78f.

The movable substantially tubular lower seat member 74 provides the lower seat means for engaging the outer spherical surface 70g of the ball to block passage of well fluids therebetween when sealing engagement. The substantially tubular seat member 74 is provided with an upwardly facing arcuate sealing surface 74a carrying a resilient seat ring 75 thereon for engaging the ball to block leakage or passage of fluid therebetween. The resilient seat ring 75 is preferably employed, but the seal effected by the arcuate surface 74a is sufficient to block leakage of fluid between the lower seat means 74 and the ball 70.

The lower seat 74 is biased upwardly by the urging of spring 82 to urge the sealing surface 74a into sealing engagement with the ball 70 while a chevron packing 84 blocks passage of well fluids between the lower seat 74 and the housing sleeve 22. The lower seat 74 forms outwardly projecting lugs 74b and 74c for controlling the reciprocating longitudinal movement of the lower operator sleeve 74. The lug 74b forms an upwardly facing operating surface 74d disposed adjacent the operating surfaces 78d and 78e of the cam disc 78. The ear 74c forms an operating surface 74e cooperating with the cam disc 80 in a similar manner. The ears 74b and 74c are slotted in the manner illustrated in FIG. 15 to enable the sleeve 74 to move longitudinally relative to the support fingers 76 and 77. The extensions 74b and 74c are disposed above the shoulder 22a of the housing member 22 and which would provide the lower limit stop for the lower seat 74. The lower seat 74 also serves as a ball follower to maintain the ball 70 in sealing engagement with the upper seat 72.

Figure 10A:
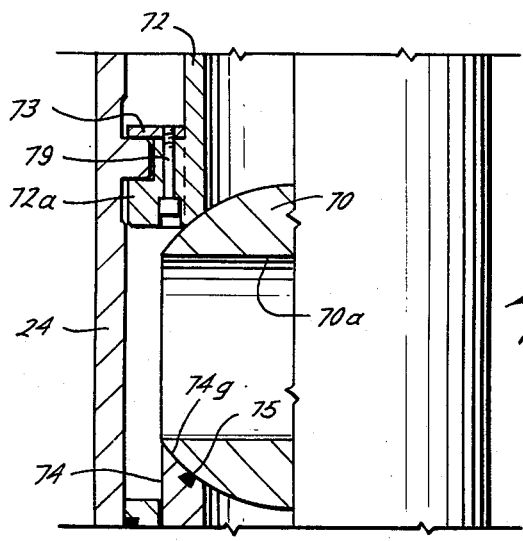
FIG. 10A is a view taken along line 10A—10A of FIG. 10.

As is best illustrated in FIGS. 10A and 15, the upper seat means or sleeve 72 is secured with the housing sleeve 24 against longitudinal movement relative thereto. During assembly of the valve apparatus, the upper seat 72 is first installed in the valve from below with the lower housing 22 absent by threadedly disengaged at 23 from the lower sleeve 24. The threadedly attached locking clips 73 and 73' are passed upwardly through the cut out openings 24b and 24c in the annular locking ring 24a and then rotated 90° before tightening the threaded bolts 77 and 77' from the bottom. When this is completed the ball 70, the cam discs 78 and 80 and the support fingers 76 and 77 are assembled in the operating unit and moved into engagement with the upper seat 72. The lower seat 74 along with the spring 82 is then installed by making up the lower housing sleeve 22 with the housing sleeve 24 by threaded engagement 23.

The upper operator sleeve 72 is provided with a downwardly facing arcuate sealing surface 72b engaging the outer spherical surface of the ball 70g for blocking passage of fluid therebetween when in sealing engagement. While the upper seat means 72 is secured with the housing against longitudinal movement, the ball 70 is enabled to move longitudinally by the spacing of the surfaces 76g and 22a for providing at least partial spacing of the upper seat 72 and the ball 70 as will be described hereinafter in greater detail.

With the ball 70 the cam discs 78 and 80 and the support pins 76 and 77 installed in the valve in the manner previously described, the operator member 34 is operably connected with the cam discs 78 and 80 by the longitudinally split operator adapter 35.

As previously set forth herein, the operator sleeve 34 is a tubular member essentially reciprocating longitudinally for effecting rotational operation of the ball 70. The adapter section 34 is a longitudinally bisected tubular section. While the operation of the tubular section 35 will be described hereinafter with respect to only one bisected portion, it will be understood that the other bisected portion is essentially of identical construction, but reversed, to insure engagement of the cam slots 78f and 80f on opposite sides of the ball 70 but on the same side of the axis of rotation of the ball 70. Referring now to FIG. 15, the adapter section 35 forms threads 35a threadedly engaging the operator member 34 for securing the operator extension 35 with the operator sleeve 34 and for securing the two halves of the extension 35 together as an integral unit. Chevron packing 84 is carried by the operator sleeve 34 in engagement with the upper tubular seat 72 for blocking passage of well fluids therebetween by effecting a sliding seal. Each of the split portions 35b and 35c have a downwardly extending finger portion 35d and 35e, respectively, disposed eccentrically to the axis of rotation of the ball 70 (FIG. 7) and each mount an inwardly projecting pivot pin 35f and 35g, respectively, that are received within the slots 78f and 80f of the cam discs 78 and 80, respectively. Longitudinal reciprocation of the operator member 34 moves the pivot pins 35f and 35g from the position illustrated in FIG. 3 to the lower position illustrated in FIG. 4 for effecting opening rotation of the ball 70. The pivot pins 35f and 35g essentially effect rotation of the cam discs 78 and 80, respectively, which engage the ball lugs 70d to effect rotation of the ball 70. In addition, rotation of the cam discs 78 and 80 effect spacing or movement of the lower seat 74 from sealing engagement with the ball 70 prior to effecting rotation of the ball 70. Furthermore, the downward longitudinal movement of the adapter section 35 also effects sufficient longitudinal downward movement of the ball 70 to effect partial spacing from the fixed upper seat 72 to insure equalization of well fluid pressure about the ball 70 prior to rotating the ball 70 with the cam discs 78 and 80.

Operation

In the use and operation of the present invention, the safety valve well apparatus A of the present invention is made up in the production tubing T at the desired location therein and is run into the well W as is well known in the art. Prior to lowering the well apparatus A into the well a first or normal control fluid conduit L-1 is connected to the normal operating port for communicating with normal operating expansible chamber 60 and a second or balance line control conduit L-2 is connected to the locking port of the valve and which communicates with the expansible chambers 58 and 66. The arrangement of these inlet ports and their manner of communication to the expansible chambers 58, 60 and 66 is set forth in U.S. Pat. No. 3,981,321 and to which reference has previously been for incorporation of its disclosure herein.

When the well apparatus A is at the desired depth in the well W the packer P is set for sealing between the production tubing and the casing C for directing the flow of well fluids through the bore B of the production tubing T. While the casing may not extend continuously from the packer P to the ground surface G sufficient casing C is located adjacent the surface G to enable mounting of the well head flow apparatus or christmas tree X at the surface. Provisions are made adjacent the surface for bringing the control fluid conduits L-1 and L-2 to remote controllers S-1 and S-2, respectively. Such controllers S-1 and S-2 normally include a supply of control fluid which may be pressured or vented as it is desired. An example of a control system may be found in U.S. Pat. No. 3,035,808 which issued to G. S. Knox and which is assigned to the assignee of the present invention. Such controllers may be sensitive to a large number of well conditions and are well known in the art. With the well so completed, the normal flow pattern for well fluids in the subsurface producing formation F is to flow through the preformations O into the casing C where they are directed to flow up the bore B of the production tubing T by the packer P. Normally, such flow of controlled at the surface by the valves located on the christmas tree X.

To enable flow through the bore B of the production tubing T it is necessary to operate the valve apparatus to the open position for enabling flow to the surface. This is preferably accomplished by increasing the control fluid pressure in the normal control fluid conduit L-1 using the first control fluid supply means S-1 while venting the second control fluid supply means S-2 to prevent a pressure build-up in the second control fluid conduit L-2 during operation of the valve apparatus A. By using the intermediate expansible chamber 60 for normal operation, the second control fluid conduit L-2 which communicates with the lower expansible chamber 66 and the upper expansible chamber 58 can serve as a balance line for offsetting hydrostatic head of the control fluid and therefore enable the running of the valve apparatus A at a greater depth since the springs 36 and 54 will not be required to support the hydrostatic head of control fluid and their operating conduit.

Since it is desirable that the well apparatus A of the present invention be of the failsafe nature in that the vavle is closed in the absence of a opening signal communicated to the valve, the valve is normally in the position illustrated in FIG. 3. Application of increased control fluid pressure through the conduit L-1 will effect downward movement of the operator sleeve 34 and the operator extension 35 to the lower position illustrated in FIG. 4 for effecting opening rotation of the ball.

Figure 11:
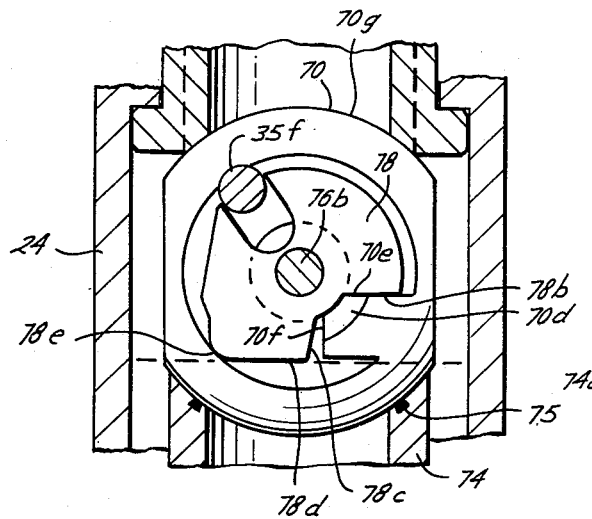
FIGS. 11, 12, 13, and 14 are similar views, arranged in increasing numerical order, illustrating the sequence of opening operation of the safety valve apparatus of the present invention.
Figure 12:
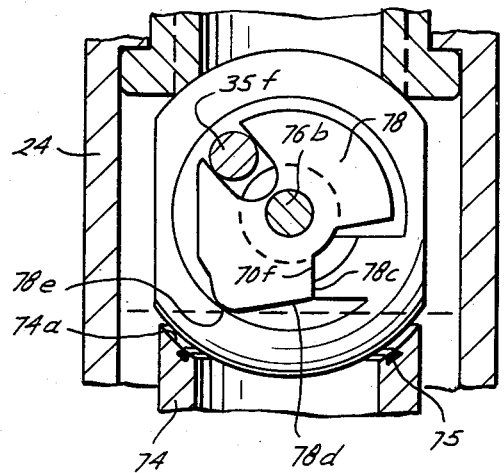
Figure 14:
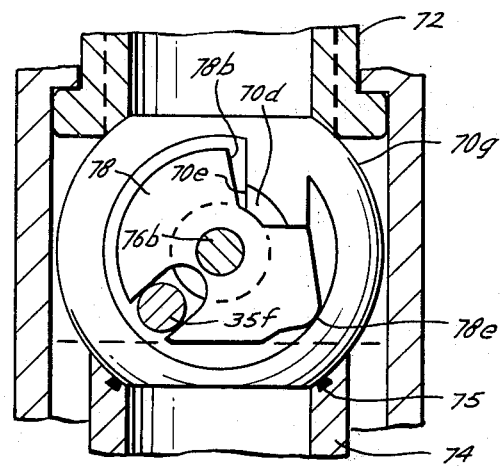

The detail sequence of opening rotation of the ball 70 is best illustrated in FIGS. 11–14, and while the operating sequence will be described with reference to cam disc 78 and eccentric pin 35f, it is to be understood that cam disc 80 and eccentric pin 35g are operating in a similar manner. The initial downward movement of the operator slleve 34 and extension 35 brings the eccentric pivot pin 35f into engagement with the side of the eccentric slots 78f of the cam discs 78 as illustrated in FIG. 11. The initial subsequent increment of downward movement of the operator extension 35 is illustrated in FIG. 12 where the pivot pin 35f is commencing to rotate the cam disc 78 about the concentric mounting with the ball 70. This initial movement activates the cam surface 78d and rounded portion 78e thereof for moving the lower sleeve 74 downwardly away from engagement with the ball 70 by the engagement of the cam disc 78 with the operating surface 74d. The downward movement of the lower seat 74 from the ball effects spacing of the annular sealing surface 74a and the seat ring 75 from the ball 70 and enabling flow of well fluids therebetween to equalize well fluid pressure about the ball 70.

Figure 13:
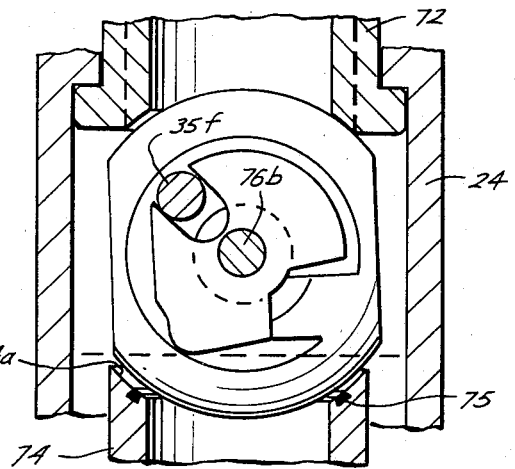

When the spacing of the lower seat 74 is achieved, the operating surface 78c of the cam is moved into engagement with the operating surface 70f of the ball ear or extension 70d. The next increment of downward movement by the operator sleeve 34 effects a compound movement of the ball 70. The engagement of the shoulder 78c of the cam with the surface 70f of the ball tends to impart a rotational movement or couple to the ball. In addition, the downward movement of the eccentric pin 35f is transmitted through the cam disc 78 to the concentric fingers 76b for moving the ball 70 and support member 76 downwardly sufficiently to bring the lower surface 76a of the ball support member 76 into engagement with the shoulder 22a of the member 22. The rotational movement imparted to the ball in conjunction with the longitudinal movement of the axis of rotation thereof effects the condition illustrated in FIG. 13 in which the ball 70 has partially rocked off the upper seat 72. The partial spacing of the ball from the sealing surface of the upper seat 72 enables passage of well fluids therebetween to equalize the well fluid pressure about the ball and thereby minimize the frictional resistance to rotation resulting from the differential pressure loading on the ball. In FIG. 13, the spacing is effected on the side of the ball opposite the ears 70d of the ball due to the result of forces tending to move the ball away from that portion of the seat 72. During the partial spacing of the seat 72, the lower seat 74 is maintained spaced from the ball 70 to insure well fluid pressure equalization about the ball.

The continued downward movement of the eccentric pin from the condition illustrated in FIG. 13 rotate the ball to the open position in the normal manner. During such rotation the ball is maintained at least partially spaced from the upper seat due to the downward force applied to the cam disc by the operator extension 35. When the ball is fully rotated open, the cam discs 78 and 80 are arranged to enable the lower seat sleeve 74 to move upwardly as a ball follower back into sealing engagement with the ball 70 and to move the ball 70 into sealing engagement with the upper seat 72. This returns the ball support members 76 and 77 to the condition illustrated in FIG. 4 with the surfaces 76a spaced from the surface 22a of the housing sleeve 22. When the ball is in the condition illustrated in FIG. 13, the shoulders 76g and 22a are in engagement.

With the valve in the open position, well fluids are produced in the normal manner without any flow restriction being provided by the valve apparatus A. When it is desired to close the valve apparatus A or the automatic controller means operate to effect closure, the control fluid pressure in the chamber 60 is vented to enable the spring 36 to move the operator sleeve 34 upwardly.

As the operator sleeve 34 and the extension 35 commence to move upwardly the eccentric pin 35f commences to rotate the cam disc 78 to bring the cam engaging surface 78e back into engagement with the surface 74d of the lower operator sleeve for again spacing the lower operator sleeve 74 from the ball 70. This spacing of the lower seat 74 is achieved prior to the engagement of the cam operating surface 78b with the surface 70e of the extension 70d of the ball for effecting rotation of the ball. While the ball is in contact with the upper seat 72 during closing rotation, the ball 70 is not held in engagement with the upper seat 72 to increase the frictional resistance to rotation and the force of gravity tends to space the ball 70 from the upper seat 72. When the operator 34 is in the upper position the ball 70 is returned to the position illustrated in FIG. 11 with the cam surfaces 78d positioned adjacent the lower operator sleeve 74, but with the lower operator sleeve 74 urged upwardly back into sealing engagement with the ball and for holding the ball 70 in sealing engagement with the upper seat means 72 for preferably effecting flow blocking seals with the ball 70 at two spaced locations.

The foregoing disclosure and description of the invention are illustrative and explanatory thereof, and various changes in the size, shape and materials as well as in the details of the illustrated construction may be made without departing from the spirit of the invention.

I claim as my invention:

1. A method of operating open a closed subsurface safety valve having a shiftable flow closure element disposed within a valve housing and engageable with a first and second seat carried by the valve housing for controlling flow of well fluids through a well tubing at a subsurface location in a well, including the steps of:
   spacing a first seat from engagement with the flow closure element;
   moving the flow closure element sufficiently to effect partially disengagement of the second seat to enable flow of well fluids between the second seat and flow closure element;
   equalizing the well fluid pressure about the flow closure element sufficiently by flowing well fluids about the closure element between the spaced seats to minimize any differential in well fluid pressure across the flow closure element; and shifting the flow closure element about a substantially fixed axis relative to the valve housing to enable flow of well fluids through the safety valve and well tubing.

2. The method as set forth in claim 1, wherein the step of spacing the first seat includes the step of:
moving the first seat from engagement with the flow closure element.

3. The method as set forth in claim 1, wherein the step of shifting the flow closure element includes the step of:
rotating the flow closure element to align a flow passage formed therethrough for enabling flow of well fluids through the flow passage.

4. A method of operating open a closed subsurface safety valve having a shiftable flow closure element engageable with a first and second seat for controlling flow of well fluids through a well tubing at a subsurface location in a well, including the steps of:
spacing a first seat from engagement with the flow closure element;
moving the flow closure element sufficiently to effect partially disengagement of the second seat to enable flow of well fluids between the second seat and flow closure element;
equalizing the well fluid pressure about the flow closure element sufficiently by flowing well fluids about the closure element between the spaced seats to minimize any differential in well fluid pressure across the flow closure element;
shifting the flow closure element to enable flow of well fluids through the safety valve and well tubing; and
supporting the flow closure element against longitudinal movement during rotation of the flow closure element to align the flow passage therethrough.

5. The method as set forth in claim 5, wherein the step of rotating the flow closure element includes the steps of:
engaging the flow closure element at a pair of turning locations with an operator member; and
moving the operator member relative to the flow closure element sufficiently to effect rotation of the flow closure element.

6. The method as set forth in claim 5, wherein the step of moving the operator member includes the step of:
applying a control fluid pressure from the earth surface to move the operator member relative to the flow closure element.

7. A method of operating open a closed subsurface safety valve having a rotatable ball flow closure element disposed within a valve housing engageable with a first and second seat carried by the valve housing for controlling flow of well fluids through a well tubing at a subsurface location in a well, including the steps of:
spacing a first seat from engagement with the ball flow closure element;
moving the ball flow closure element sufficiently to effect partial disengagement of the second seat to enable flow of well fluids between the second seat and the ball flow closure element;
equalizing the well fluid pressure about the ball flow closure element sufficiently by flowing well fluids about the ball flow closure element between the spaced seats to minimize any differential in well fluid pressure across the flow closure element; and rotating the flow closure element about a substantially fixed axis relative to the valve housing to enable flow of well fluids through the safety valve and well tubing.

8. The method as set forth in claim 7, wherein the step of spacing the first seat includes the step of:
moving the first seat from engagement with the ball flow closure element.

9. The method as set forth in claim 7, wherein the step of rotating the flow closure element includes the step of:
rotating the ball flow closure element to align a flow passage formed therethrough for enabling flow of well fluids through the flow passage.

10. A method of operating open a closed subsurface safety valve having a rotatable ball flow closure element engageable with a first and second seat for controlling flow of well fluids through a well tubing at a subsurface location in a well, including the steps of:
spacing a first seat from engagement with the ball flow closure element;
moving the ball flow closure element sufficiently to effect partially disengagement of the second seat to enable flow of well fluids between the second seat and the ball flow closure element;
equalizing the well fluid pressure about the ball flow closure element sufficiently by flowing well fluids about the ball flow closure element between the spaced seats to minimize any differential in well fluid pressure across the flow closure element;
rotating the flow closure element to enable flow of well fluids through the safety valve and well tubing;
rotating the ball flow closure element to align a flow passage formed therethrough for enabling flow of well fluids through the flow passage; and
supporting the ball flow closure element against longitudinal movement during rotation of the ball flow closure element to align the flow passage therethrough.

11. The method as set forth in claim 10, wherein the step of rotating the ball flow closure element includes the steps of:
engaging the ball flow closure element at a pair of eccentric turning locations on the ball flow closure element with an operator member; and
moving the operator member relative to the ball flow closure element sufficiently to effect rotation of the ball flow closure element.

12. The method as set forth in claim 11, wherein the step of moving the operator member includes the step of:
applying a central fluid pressure from the earth surface to move the operator member relative to the ball flow closure element.

13. A method of operating open a closed subsurface safety valve having a valve housing mounting rotatable ball flow closure element engageable with a valve seat carried by the valve housing for controlling flow of well fluids through a well tubing at a subsurface location in a well, said rotatable ball flow closure element supported against substantial longitudinal operating movement in said valve housing to rotate the ball closure element about a substantially fixed axis relative to the valve housing, including the steps of:
spacing the valve seat from sealing engagement to partial engagement with the ball flow closure element;

equalizing the well fluid pressure about the ball flow closure element sufficiently by flowing well fluids about the flow closure element between the partially spaced seat and ball closure element to minimize any differential in well fluid pressure across the ball flow closure element; and rotating the ball flow closure element about the substantially fixed axis relative to the valve housing to align a flow passage formed therethrough to enable flow of well fluids through the safety valve and well tubing.

14. The method as set forth in claim 13, wherein the step of spacing the valve seat includes the step of:

moving the ball flow closure element a sufficient longitudinal distance relative to said valve housing to rock the ball flow closure element to partial engagement with the seat.

15. The method as set forth in claim 13, wherein the step of rotating the ball flow closure includes the steps of:

engaging the ball flow closure element at a pair of eccentric turning locations on the ball flow closure element with an operator member; and moving the operator member relative to the ball flow closure element sufficiently to effect rotation of the ball flow closure element.

16. The method as set forth in claim 15, wherein the step of moving the operator member includes the step of:

applying a control fluid pressure from the earth surface to move the operator member relative to the ball flow closure element.

17. A method of operating open a closed subsurface safety valve having a valve housing mounting rotatable ball flow closure element engageable with a valve seat carried by the valve housing for controlling flow of well fluids through a well tubing at a subsurface location in a well, said rotatable ball flow closure element supported against substantial longitudinal operating movement in said valve to rotate the ball closure element about a substantially fixed axis, including the steps of:

spacing partially the valve seat from sealing engagement with the ball flow closure element;

equalizing the well fluid pressure about the ball flow closure element sufficiently by flowing well fluids about the flow closure element between the partially spaced seat and ball closure element to minimize any differential in well fluid pressure across the ball flow closure element; and rotating the ball flow closure element about the substantially fixed axis relative to the valve housing to align a flow passage formed therethrough to enable flow of well fluids through the safety valve and well tubing.

18. The method as set forth in claim 17, wherein the step of rotating the ball flow closure includes the steps of:

engaging the ball flow closure element at a pair of eccentric turning locations on the ball flow closure element with an operator member; and moving the operator member relative to the ball flow closure element sufficiently to effect rotation of the ball flow closure element.

19. The method as set forth in claim 18, wherein the step of moving the operator member includes the step of:

applying a control fluid pressure from the earth surface to move the operator member relative to the ball flow closure element.

20. A method of operating open a closed subsurface safety valve having a valve housing mounting a rotatable ball flow closure element engageable with first and second valve seats carried by the valve housing for controlling flow of well fluids through a well tubing at a subsurface location in a well, said rotatable ball flow closure element supported against substantial longitudinal operating movement in said valve to rotate the ball closure element about a substantially fixed axis relative to said housing, including the steps of:

spacing the first seat from engagement with the ball flow closure element;

moving the ball flow closure element relative to the valve housing sufficiently to effect partial disengagement of the second valve seat to enable flow of well fluids between the second seat and the ball flow closure element;

equalizing the well fluid pressure about the ball flow closure element sufficiently by flowing well fluids about the ball flow closure element between the spaced seats to minimize any differential in well fluid pressure across the flow closure element; and rotating the ball flow closure element about the substantially fixed axis to align a flow passage formed therethrough to enable flow of well fluids through the safety valve and well tubing.

21. The method as set forth in claim 20, wherein the step of spacing the valve seat includes the step of:

moving the first valve seat from engagment with the ball flow closure element.

22. The method as set forth in claim 20, wherein the step of rotating the ball flow closure includes the steps of:

engaging the ball flow closure element at a pair of eccentric turning locations on the ball flow closure element with an operator member; and moving the operator member relative to the ball flow closure element sufficiently to effect rotation of the ball flow closure element.

23. The method as set forth in claim 20, wherein the step of moving the operator member includes the step of:

applying a control fluid pressure from the earth surface to move the operator member relative to the ball flow closure element.

24. A method of operating open a closed subsurface safety valve having a valve housing mounting a rotatable ball flow closure element operably connected with a pressure responsive operator member and engageable with a valve seat carried by the valve housing for controlling flow of well fluids through a well tubing at a subsurface location in a well said rotatable ball flow closure element supported against substantial longitudinal operating movement in the valve housing to rotate the ball closure element about a substantially fixed axis in said valve housing, including the steps of:

applying a control fluid pressure from the earth surface to the safety valve for moving an operator member to open the closed safety valve;

spacing the valve seat from engagement with the ball flow closure element in response to movement of the operator member by the control fluid pressure;

equalizing the well fluid pressure about the ball flow closure element sufficiently by flowing well fluids about the flow closure element between the spaced seat and ball closure element to minimize any differential in well fluid pressure across the ball flow closure element; and rotating the ball flow closure element about the substantially fixed axis relative to the valve housing to align a flow passage formed therethrough to enable flow of well fluids through the safety valve and well tubing in response to additional movement of the operator member by the control fluid pressure.

25. A method of operating open a closed subsurface safety valve having a valve housing mounting a rotatable ball flow closure element operably connected with a pressure responsive operator member and engageable with first and second valve seats carried by the valve housing for controlling flow of well fluids through a well tubing at a subsurface location in a well, said rotatable ball flow closure element supported against substantial longitudinal operating movement in said valve to rotate the ball closure element about a substantially fixed axis in said valve housing, including the steps of:

applying a control fluid pressure from the earth surface to the safety valve for moving an operator member to open the closed safety valve;

spacing the first seat from engagement with the ball flow closure element in response to movement of the operator member by the control fluid pressure;

moving the ball flow closure element sufficiently to effect partial sealing disengagement with the second valve seat to enable flow of well fluids between the second seat and the ball flow closure element;

equalizing the well fluid pressure about the ball flow closure element sufficiently by flowing well fluids about the ball flow closure element between the spaced seats to minimize any differential in well fluid pressure across the flow closure element; and rotating the ball flow closure element about the substantially fixed axis relative to the valve housing to align a flow passage formed therethrough to enable flow of well fluids through the safety valve and well tubing in response to additional movement of the operator member by the control fluid pressure.

26. A subsurface safety valve apparatus for controlling flow of well fluids through a well tubing at a subsurface location in a well, including:

a valve housing adapted to be mounted with the well tubing, said valve housing having a passageway formed therethrough for enabling flow of well fluids through said valve housing;

a flow closure element mounted with said valve housing disposed in said passageway for movement to and from an open position for enabling flow of well fluids through said passageway and a closed position for blocking flow of well fluids; through said passageway;

seat means adjacent said flow closure element for sealing with said flow closure element to block passage of well fluids therebetween when in sealing engagement with said flow closure element and for enabling passage of well fluids therebetween when said flow closure element and said seat means are out of sealing engagement therewiith; and operator means movably disposed in said passageway and operably connected with said flow closure element for effecting operation of said flow closure element to and from the open and closed position; said operator means partially spacing said seat means and said flow closure element to enable equalization of well fluid pressure about said flow closure element when moving said flow closure element from the closed position to the open position wherein any differential in well fluid pressure across the flow closure element is eliminated.

27. The apparatus as set forth in claim 26, wherein: said seat means is fixed in said valve housing; and said operator means moves said flow closure element for partially spacing from said seat means.

28. The apparatus as set forth in claim 26, wherein: said operator means having sleeve means cooperating with said valve housing for forming an expansible chamber therebetween, said sleeve means forming a pressure responsive surface exposed to fluid pressure in said expansible chamber for effecting movement of said operator means to obtain the partial spacing.

29. The apparatus as set forth in claim 28, including: means for controlling the fluid pressure in said expansible chamber from a location remote from said valve housing.

30. The apparatus as set forth in claim 26, wherein: said flow closure element is substantially a ball element having an opening therethrough for rotation to and from the open and closed positions.

31. The apparatus as set forth in claim 30, wherein: said ball closure element is mounted with said housing by concentric engagement with ball element support means for enabling limited longitudinal movement of said ball closure element relative to said valve housing, said ball closure element rotating to and from the open and closed position about an axis of rotation provided by said ball element support means; and said operator means moves longitudinally relative to said ball closure element axis of rotation for rotating said ball closure element to and from the closed position.

32. A subsurface safety valve apparatus for controlling flow of well fluids through a well tubing at a subsurface location in a well, including:

a tubular valve housing adapted to be mounted with the well tubing, said valve housing having a passageway formed therethrough for enabling flow of well fluids through said valve housing;

a ball-type flow closure element mounted with said valve housing disposed in said passageway for rotational movement to and from an open position aligns an opening through said ball with said passageway for enabling flow of well fluids through said passageway and a closed position for blocking flow of well fluids through said passageway;

seat means fixed in said tubular valve housing and disposed adjacent said flow closure element for sealing with ball-type flow closure element to block passage of well fluids therebetween when in sealing engagement with said ball-type flow closure element and for enabling passage of well fluids therebetween when said ball-type flow closure element and said seat means are out of sealing engagement therewith;

movable seat means engaging said flow closure element for urging said ball-type flow closure element and said fixed seat means into sealing engagement; and operator means movably disposed in said passageway and operably connected with said flow closure element for effecting operation of said flow closure element to and from the open and closed position;

said operator means partially spacing said ball-type flow closure element from engagement with said fixed seat means to equalize well fluid pressure about said flow closure element when moving said flow closure element from the closed position to the open position wherein any differential in well fluid pressure across the flow closure element is minimized.

33. The apparatus as set forth in claim 32, including:
movable seat means carried by said tubular valve housing and movable relative to said housing for sealing with said ball-type flow closure element to block passage of well fluids therebetween when in sealing engagement with said ball-type flow closure element and for enabling passage of well fluid therebetween when said ball-type closure element and said movable seat means are spaced from sealing engagement; and
said operator means moving said movable seat means from sealing engagement with said ball-type flow closure element prior to partially spacing said ball-type closure element and said fixed seat means.

34. The apparatus as set forth in claim 33, wherein:
said movable seat means having a primary sealing surface and a resilient secondary sealing surface engaging said ball-type flow closure element for sealing with said ball-type flow closure element.

35. The apparatus as set forth in claim 34, wherein:
said operator means having sleeve means cooperating with said valve housing for forming an expansible chamber therebetween, said sleeve means forming a pressure responsive surface exposed to fluid pressure in said expansible chamber for effecting movement of said operator means to obtain the partial spacing.

36. A subsurface safety valve apparatus for controlling flow of well fluids through a well tubing at a subsurface location in a well, including:
a valve housing adapted to be mounted with the well tubing, said valve housing having a passageway formed therethrough for enabling flow of well fluids through said valve housing;
a ball-type flow closure element pivotally mounted with said valve housing and disposed in said passageway for rotating movement about the pivoting mounting with said housing to and from an open position for enabling flow of well fluids through said passageway and a closed position for blocking flow of well fluids through said passageway said pivoting mounting of said ball-type closure element enabling a small increment of longitudinally movement of said ball-type closure element substantially prior to rotation;
seat means fixed in said tubular valve housing and disposed adjacent said flow closure element for sealing with said ball-type flow closure element to block passage of well fluids therebetween when in sealing engagement with said flow closure element and for enabling passage of well fluids therebetween when said ball-type flow closure element and said seat means are out of sealing engagement therewith; and
operator means movably disposed in said passageway and operably connected with said ball-type flow closure element for effecting operation of said ball-type flow closure element to and from the open and closed position; said operator means partially spacing said seat means and said ball-type flow closure element to enable equalization of well fluid pressure about said ball-type flow closure element prior to rotating said ball-type flow closure element from the closed position to the open position wherein any differential in well fluid pressure across the ball-type flow closure element is minimized.

37. The apparatus as set forth in claim 35, including:
means for controlling the fluid pressure in said expansible chamber from a location remote from said valve housing.

* * * * *